(12) United States Patent
McIntyre (10) Patent No.: US 10,410,557 B2
(45) Date of Patent: Sep. 10, 2019

(54) DISPLAY APPARATUS

(71) Applicant: Cub Pty Ltd, Southbank (AU)

(72) Inventor: Karl McIntyre, Richmond (AU)

(73) Assignee: Cub Pty Ltd., Southbank (AU)

( * ) Notice: Subject to any disclaimer, the term of this patent is extended or adjusted under 35 U.S.C. 154(b) by 69 days.

(21) Appl. No.: 15/529,904

(22) PCT Filed: Nov. 27, 2015

(86) PCT No.: PCT/AU2015/000723
§ 371 (c)(1),
(2) Date: May 25, 2017

(87) PCT Pub. No.: WO2016/081987
PCT Pub. Date: Jun. 2, 2016

(65) Prior Publication Data
US 2017/0330494 A1    Nov. 16, 2017

(30) Foreign Application Priority Data
Nov. 28, 2014 (AU) ................ 2014904838

(51) Int. Cl.
| | |
|---|---|
| *G09F 23/06* | (2006.01) |
| *G02F 1/1345* | (2006.01) |
| *B67D 1/08* | (2006.01) |
| *G09F 3/14* | (2006.01) |
| *G09F 3/20* | (2006.01) |
| *G09F 13/22* | (2006.01) |
| *G09F 13/04* | (2006.01) |

(52) U.S. Cl.
CPC .......... *G09F 23/06* (2013.01); *B67D 1/0877* (2013.01); *G02F 1/13452* (2013.01); *G09F 3/14* (2013.01); *G09F 3/205* (2013.01); *G09F 3/208* (2013.01); *G09F 13/0413* (2013.01); *G09F 2013/0418* (2013.01); *G09F 2013/222* (2013.01)

(58) Field of Classification Search
CPC . G09F 23/06; G09F 3/14; G09F 3/205; G09F 3/208; G09F 13/0413; G09F 2013/0418; G09F 2013/222; B67D 1/0877; G02F 1/13452
See application file for complete search history.

(56) References Cited

U.S. PATENT DOCUMENTS

| | | | |
|---|---|---|---|
| 6,758,002 B1 * | 7/2004 | Duguay .............. | G09F 13/0413 40/574 |
| 8,276,879 B2 * | 10/2012 | Erickson ................. | F16K 31/60 251/231 |
| 2005/0029309 A1 * | 2/2005 | Forsyth .................... | B67D 1/06 222/400.7 |

(Continued)

FOREIGN PATENT DOCUMENTS

| | | |
|---|---|---|
| AU | 2010200211 A1 | 7/2010 |
| AU | 2010200211 B2 | 7/2010 |
| AU | 2010101453 | 2/2011 |

*Primary Examiner* — Mary Ellen Bowman
(74) *Attorney, Agent, or Firm* — Levy & Grandinetti (57) ABSTRACT

A display apparatus has a panel for receiving and/or displaying advertising material. The apparatus also includes a connector that is attachable to the panel, and a fastener for removably connecting the panel to a pipe of a beverage font. The fastener is removably attachable to the connector in two or more orientations.

20 Claims, 10 Drawing Sheets

(56) References Cited

U.S. PATENT DOCUMENTS

2011/0239412 A1* 10/2011 Sano .................... F16B 21/086
                     24/16 R
2014/0001203 A1* 1/2014 Goldstein ............... G09F 23/06
                     222/23

* cited by examiner

DISPLAY APPARATUS

TECHNICAL FIELD

The present invention generally relates to a display apparatus. More particularly, the present invention relates to a display apparatus that can be used to display advertising material in physical proximity to a beverage font.

BACKGROUND ART

The following discussion of the background art is intended to facilitate an understanding of the present invention only. The discussion is not an acknowledgement or admission that any of the material referred to is or was part of the common general knowledge as at the priority date of the application.

Beverage fonts (or 'founts'), which are found in most licensed venues (i.e venues dispensing alcoholic beverages), are articles to which taps are mounted and beverage supply lines installed. The requisite beverage is drawn from a supply (such as a keg, barrel or the like), along the supply line and out to the tap, at which point it is dispensed to the customer.

Fonts are often made according to very ornamental designs and come in a wide variety of shapes and sizes. Fonts occupy a privileged position at the front of the customer-facing area of the bar. It is understood that many consumers have not made up their mind as to which brand of beverage they will order until they have approached the font and seen what is on offer.

The display of visual material in proximity to beverage fonts has generally been limited to the attachment of a 'badge' near to each of the font's one or more taps.

The badge is primarily used to indicate the brand of beverage that is available from the particular tap. In this regard, Australian Patent Application No 2010200211 describes a device for mounting a replaceable badge to a horizontally extending pipe that forms part of a beverage font.

A more elaborate arrangement is described in United States Patent Application No 2014/0001203, which shows a device that includes a toggle clamp for attaching the device to a pipe, an advertisement frame and an interposed connector.

The present invention aims to provide an alternative approach to displaying visual material (such as branding, advertising and information materials) in proximity to beverage fonts.

SUMMARY OF INVENTION

According to a first aspect of the present invention, there is provided a display apparatus comprising:
 a panel for receiving and/or displaying advertising material;
 a connector that is attachable to the panel; and
 a fastener, for removably connecting the panel to a pipe of a beverage font, the fastener being removably attachable to the connector in two or more orientations.

Preferably, the fastener includes a plug and the connector includes a socket, the plug and socket having matching profiles such that the plug is receivable in the socket in two or more orientations. According to one embodiment, the plug and socket have a profile that is symmetrical about both horizontal and vertical axes. Such a profile allows the plug to be received in the socket in four separate orientations. Optimally, the plug and socket have a cross-shaped profile.

Preferably, the fastener includes a flexible strip with means for securing the strip to itself so as to encircle the pipe of the beverage font and removably connect the panel to the pipe. Typically, the securing means includes one or more apertures in the strip and a hook, in use the strip being securable to itself by passing the hook through one of the apertures.

According to particularly preferred embodiments, the hook and strip are composed of different materials with the hook being harder than the strip. Optimally, the hook and strip are composed of silicon materials having different hardness. The use of silicon materials allows the fastener to act as a barrier for the panel against condensation and/or cold from the pipe.

Optionally, the hook is separate from and attachable to, the strip, the hook and strip each including a part of the plug such that a complete plug is formed when the hook is attached to the strip. Preferably, the hook and strip each include a male or female interlocking component which form the plug when interlocked.

Preferably, the connector is attachable to the panel such that its translational position is adjustable. According to one embodiment the connector includes a channel through which a rod is receivable, the connector being movable along the rod and securable to the rod at a desired translational position.

Preferably, the connector is attachable to the panel in a manner that allows the panel's rotational orientation to be adjusted relative to the connector. Typically, the panel includes at least one rod holder that is configured to receive a rod, the rod holder being rotatable about the rod and securable to the rod at a desired angular position.

Optionally, the panel includes access means for allowing the replacement or updating of the advertising material. Typically, the panel comprises first and second pivotally connected casings for this purpose. According to particularly preferred embodiments, the casings include a lock for securing the casings together so as to prevent unauthorised access to the advertising material. The casings may be provided with magnetic means to enable the casings to be releasably secured together in a convenient manner. Typically the magnetic strength of the magnetic means will be such as to enable the casings to be held together in a manner which allows the casings to be maintained in a closed condition when the magnetic means is engaged, and to be releasable or separable by manual finger pressure when access to the advertising material is needed. The magnetic means may take any suitable form. It may in one embodiment be a ferromagnetic arrangement. By way of example, one of the casings may carry or incorporate a ferrous component and the other of the casings may carry a magnetic element. The magnetic element may be take the form of a bead, clip or other protrusion to engage with a complementary component of the other casing. Other arrangements for creating a magnetic field to give effect to this feature are envisaged with the scope of the invention.

According to another aspect of the present invention, there is provided a display apparatus comprising:
 a panel for receiving and/or displaying advertising material; and
 a fastener, for removably connecting the panel to a pipe of a beverage font and for insulating the panel against condensation from the pipe.

Preferably, the fastener includes a rubberised pipe-engaging surface.

In use, the pipe engaging surface serves as the insulator against condensation from the pipe.

Optimally, the fastener includes a flexible strip with means for securing the strip to itself so as to encircle the pipe of the beverage font and removably connect the panel to the pipe. Typically, the securing means includes one of more apertures in the strip and a hook, in use the strip being securable to itself by passing the hook through one of the apertures.

According to particularly preferred embodiments, the hook and strip are composed of different materials with the hook being harder than the strip. Optimally, the hook and strip are composed of silicon materials having different hardness.

Optionally, the hook is a separate from and attachable to, the strip, the hook and strip each including a part of the plug such that a complete plug is formed when the hook is attached to the strip. Preferably, the hook and strip each include a male or female interlocking component which form the plug when interlocked.

The display apparatus may in one embodiment be provided with illumination means to illuminate the advertising material contained in the panel and/or tap(s) of the beverage font to which the display apparatus is attached. The illumination means will typically take the form of one or more LED lights powered by a power source. The light(s) may be provided in the form of a strip located along an edge of the panel of the display apparatus. In one preferred embodiment, the display apparatus is provided with an illumination screen of appropriate dimension to facilitate illumination of the advertising material received by the panel. The illumination screen will typically be located behind the advertising material in a customer-facing orientation so that the advertising material is back-lit. In a particularly preferred embodiment the panel comprises a casing to receive the advertising material and an illumination screen receivable in the casing behind the advertising material in a customer-facing orientation so that the advertising material is back-lit. Illumination of a tap or tap bank of a beverage font may be provided by one or more LED lights connected to a power source and to which one or more wires is attached. A conduit in the form of a wire shroud may be positioned in proximity to the beverage font so as to shroud potentially unsightly wires from customer view. Typically the conduit will take the form of an elongated hollow member such as a tube which is capable of receiving one or more wires fed along it, and positioned on the underside of the beverage font pipe. The elongated hollow member may include a notch to facilitate egress of one or more wires fed along it. The conduit may act also as a cold conductor, and for this purpose may be formed from a thermally conductive metallic material or other synthetic or metal-like material having thermally conducting properties and capable of achieving that effect.

The display apparatus may be provided with a dimmer to enable variable light from a suitable light source such as an illumination means to be applied to the panel of the display apparatus and/or to a tap or taps of a beverage font and to thereby create different moods or light effects depending on such matters as the nature of the occasion or the time of day.

The panel of the display apparatus is typically adapted to receive advertising material such as a printed card or a display screen such as an electronic display screen. The panel may itself constitute a display screen such as an electronic display screen capable of transmitting electronic images such as still or moving images. The panel may be capable of receiving electronic signals and transmitting the signals on or through the display screen. The panel may be internet-enabled in order to effect this aspect.

BRIEF DESCRIPTION OF THE DRAWINGS

Embodiments of the invention will now be further explained and illustrated by reference to the accompanying drawings in which:

FIG. 20 is an exploded view of the display apparatus illustrated in FIGS. 1 to 16, and FIGS. 21 and 22 show respectively a perspective view of a beverage font array or bank to the underside of which has been attached a wire shroud in the form of a conduit, and a cut-away view of the conduit from its underside.

DESCRIPTION OF EMBODIMENTS

Figure 1:
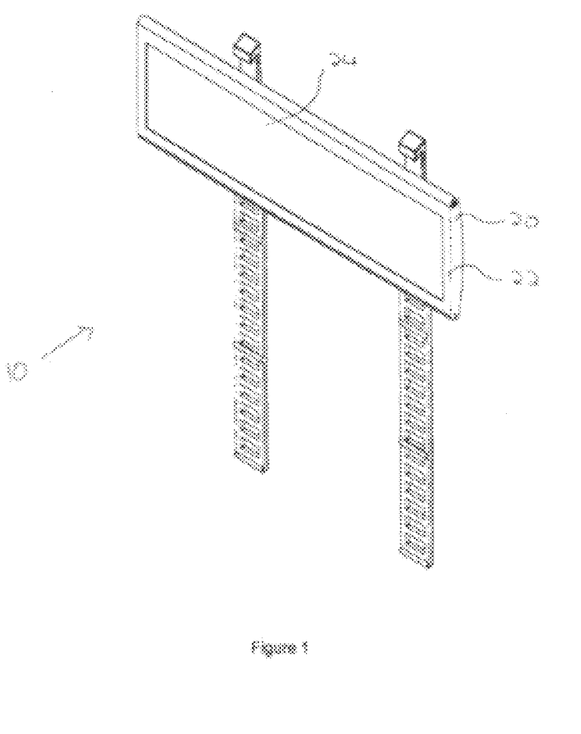
FIG. 1 is a front perspective view of a display apparatus in accordance with an embodiment of the invention.
Figures 2, 3:
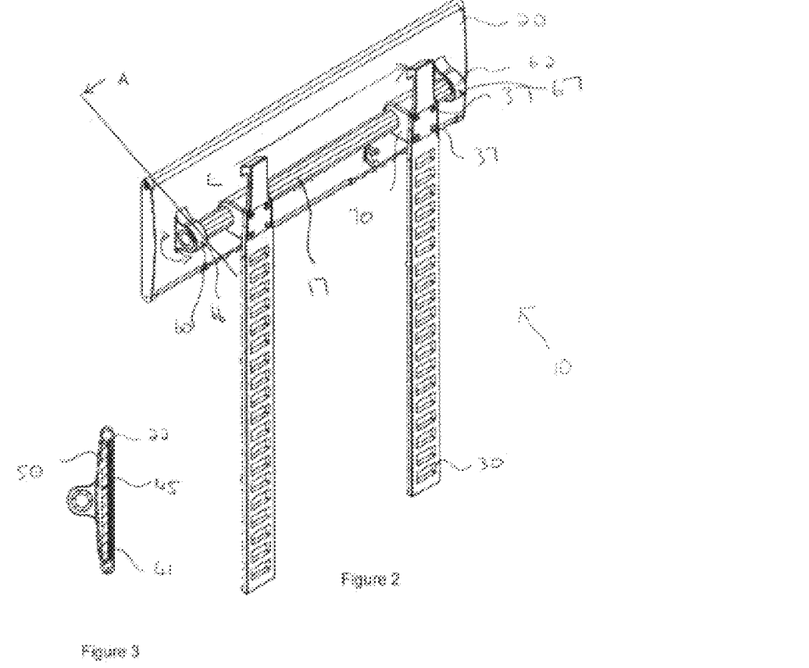
FIG. 2 is a rear perspective view of the display apparatus illustrated in FIG. 1.
FIG. 3 is a cross-sectional view through the line A in FIG. 2.

Turning to FIGS. 1 and 2 a display apparatus 10 is illustrated. Display apparatus 10 is particularly suited to displaying advertising material in proximity to beverage fonts that are located in licensed venues. For this purpose, display apparatus 10 includes an elongated and substantially planar panel 20 that is adapted to receive advertising material such as a printed card or an electronic display screen. Panel 20 includes a front casing 22 that defines a window 24 through which the received advertising material can be viewed.

Figures 4, 5:
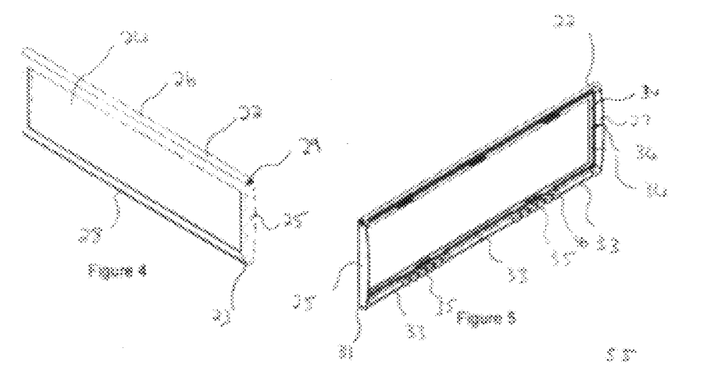
FIG. 4 is a front perspective view of the front casing of the display apparatus illustrated in FIG. 1.
FIG. 5 is a rear perspective view of the front casing illustrated in FIG. 4.

Front casing 22 is illustrated in FIGS. 4 and 5 and includes a generally flat front face 23 and a pair of lateral edges 25, 27 having a slightly arcuate form. A threaded shaft 29 is provided at the top of lateral edge 25.

Upper longitudinal edge 26 includes a lip with a generally rounded profile, whereas lower longitudinal edge 28 includes a longitudinal channel 31 extending throughout its length. Channel 31 is defined by a series of exposed sections 33 which are separated by a pair of exposed regions 35. Semi-exposed regions 35 are formed from a plurality of spaced apart annular ribs 36.

A series of vertically spaced pins 34 are provided adjacent to lateral edge 27. As described below, pins 34 are used as a contact surface for receiving a display screen by way of gluing.

Front casing 22 attaches to a rear casing 50 to form a box-like unit. Rear casing (as illustrated most clearly in FIGS. 6 and 7) has a generally flat front face 51 and a slightly curved rear face 52. Upper longitudinal edge of rear casing 50 includes a cylindrical member 53 extending therefrom. Cylindrical member 53 extends for almost the entire length of rear casing 50, but includes a pair of cut-out regions 54, 55 at each end thereof. A threaded shaft 56 is provided in the end of cylindrical member 53 adjacent to cut-out region 54.

Figures 6, 7:
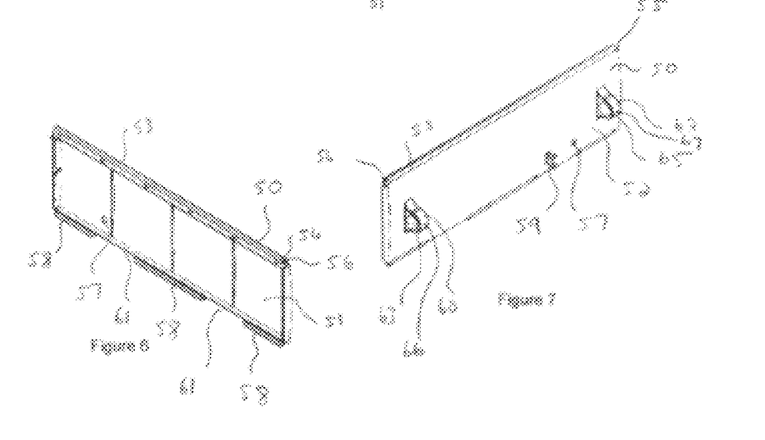
FIG. 6 is a front perspective view of the rear casing of the display apparatus illustrated in FIG. 1.
FIG. 7 is a rear perspective view of the rear casing illustrated in FIG. 6.
Figure 8:
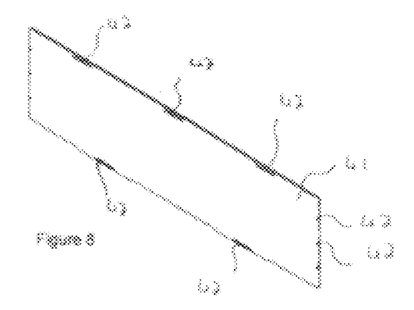
FIG. 8 is a front perspective view of the front screen of the display apparatus illustrated in FIG. 1.
Figure 9:
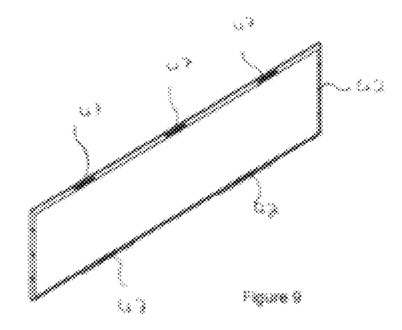
FIG. 9 is a rear perspective view of the front screen illustrated in FIG. 8.
Figure 10:
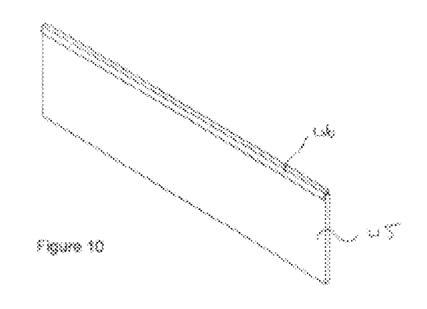
FIG. 10 is a front perspective view of the illumination screen of the display apparatus illustrated in FIG. 1.
Figure 11:
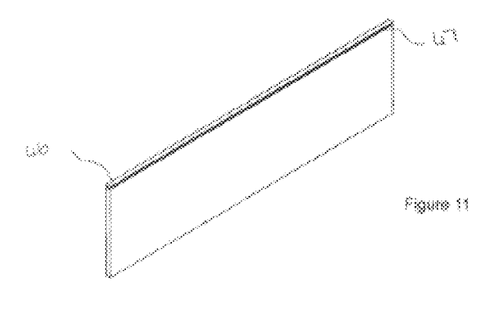
FIG. 11 is a rear perspective view of the illumination screen illustrated in FIG. 10.

A series of spaced apart tubular members 58 extend from the lower longitudinal edge of rear casing 50.

A feed hole 57 extends through front face 51 and is used to convey any power or data cables supplying the inserted advertising material out from display device 10. Any such cables can be conveniently clipped to a clip 59 provided adjacent to feed hole 57.

A pair of co-linear, spaced apart rod holders 60, 62 are integrally formed with and extend out from rear face 52. Each rod holder 60, 62 defines a circular aperture 63, 65 for (as described below) receiving a rod. Each rod holder also includes a threaded hole 66, 67 extending therethrough.

Front casing 22 and rear casing 50 are attached by locating tubular members 58 into exposed sections 33. This has the effect of locating semi-exposed regions 35 in the spaces 61 between tubular members 58 and defining a continuous channel that extends along the length of front 22 and rear casings 50. A hinge pin (not shown) with suitable diameter is then passed along the channel. This allows front 22 and rear 50 casings to be pivoted relative to each other about an axis defined by the continuous channel.

Front casing 22 and rear casing 50 are releasably secured together by inserting a screw into the screw shaft that is defined by threaded shafts 29 and 56. For security reasons, it is preferable that the screw has a unique socket shape that can only be driven by a tool with a corresponding shaped profile. In use, the tool is supplied with the display device.

Once assembled as a unit, display apparatus 10 can be used to receive a wide variety of advertising material that is currently known or may be developed in the future. The embodiment illustrated in FIGS. 3, 8, 9, 10 and 11 shows display apparatus 10 accommodating a screen 41 that is in front of an illuminated panel 45.

Figure 18:
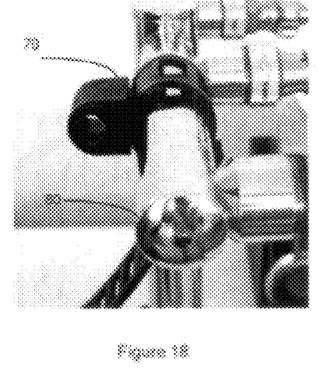

The exploded view illustrated in FIG. 18 shows display apparatus 10 further accommodating a rear screen 43.

Screen 41 is clear and is preferably manufactured from a suitable plastic material such as acrylonitrile butadiene styrene (ABS). Screen 41 is glued into front casing 22 by way of glue strips 42 provided around the periphery thereof.

A printed card carrying the advertising message is insertable into the casing 22 in front of illuminated panel 45. An aluminium extrusion 46 with an L-shaped profile extends along the top of panel 45. A strip of LED lights is located along the top upper edge of panel 45 and serves to illuminate the advertising message. The LED light strip may be provided with a dimmer (not shown) to enable variable light to be applied to panel 45 and to thereby create different moods depending on such matters as the nature of the occasion or the time of day, to name but two.

The advertising material received in display device 10 can be replaced in accordance with current campaigns and also to account for new technology in display screens and the like. Replacing advertising material is as simple as unscrewing the security screws and opening front casing 22 by rotating same about the provided hinge mechanism.

Display device 10 can be removably connected to a pipe having a circular or other cross-section. As piping invariably forms part of beverage fonts, display device 10 can be conveniently and securely installed in a wide variety of environments. Moreover, the beverage font occupies a prominent, customer-facing position in the licensed venue. Installation of display device 10 in proximity to the beverage font therefore allows for a widespread communication of the advertising message.

Connection to the pipe is by way of a fastener in the form of a strap 30, and a connector in the form a fitting 70. Fitting 70 is preferably manufactured from a hard plastic material. As illustrated most clearly in FIGS. 12, 13, 15 and 16, strap 30 is an elongated strip 32 with a series of spaced apart rectangular-shaped holes 11 provided therein. A series of three spaced apart ridges 15 are provided along the length of strip 32. The ridges 15 allow the strip 32 to grip more tightly around the pipe of a beverage font as described below, and also enable operators to get a firmer hold of the strip when fastening it to the pipe.

A hook 40 is located at the upper end of strip 32. Hook 40 is connected to strip 32 by an interlocking male 12 and female 13 components respectively located on strip 32 and the shank of hook 40. Once interlocked in this way, the components form a plug 14 with a cross-shaped profile.

Strip 32 is typically made from a strong and flexible material with a suitable tear strength. Black moulded silicone with Shore ratings of A10, A20, A30, A40 or A50 have been found to be suitable in this regard. Hook 40 is also made from silicone but preferably with a Shore rating of A40, A60, A70, A90 or A95.

Use of a silicone material in the parts of the fastener in contact with font piping is advantageous in that the fastener provides an insulating barrier against cold and condensation for the advertising material.

Figures 12, 14:
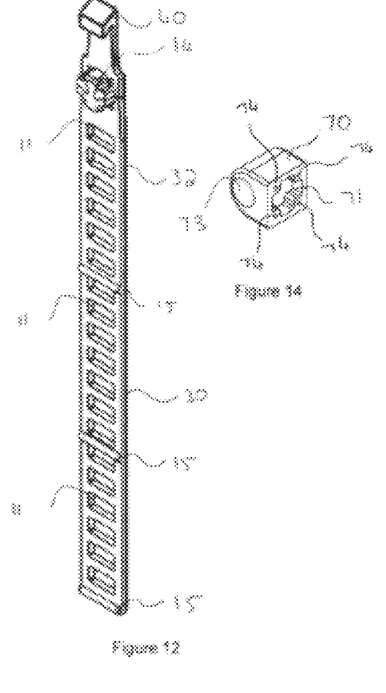
FIG. 12 if a front perspective view of the strap illustrated in FIG. 1.
FIG. 14 is a perspective view of the fitting illustrated in FIG. 2.
Figure 13:
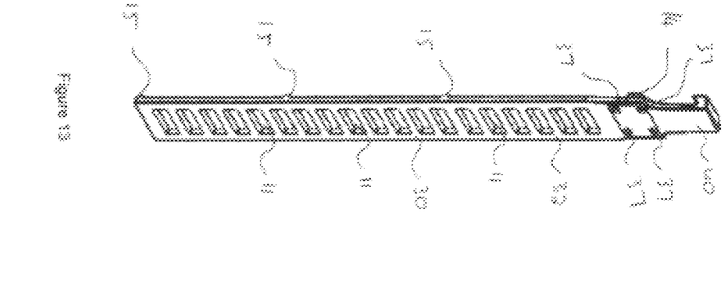
FIG. 13 is a rear perspective view of the strap illustrated in FIG. 12.
Figure 15:
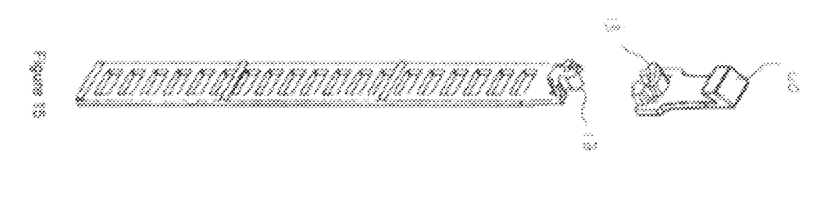
FIG. 15 is a front exploded view of the strap illustrated in FIGS. 12 and 13.
Figure 16:
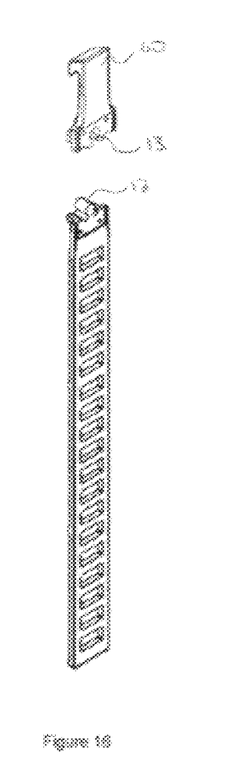
FIG. 16 is a rear exploded view of the strap illustrated in FIGS. 12 and 13.

As shown most clearly in FIG. 14, fitting 70 includes a cross-shaped socket 71 in its front face and a circular channel 73 through its lateral extent. Strap 30 is attached to fitting 70 by locating plug 14 into socket 71, with the plug being held in place in the socket by way of an interference fit. The cross-sectional shapes of the plug and socket are symmetrical about both vertical and horizontal axes. As such, it allows the strap 30 to be connected to the fitting in four separate orientations. Advantageously, this allows the strap to be attached to both vertical and horizontal piping of a beverage font.

Strap 30 is then secured to fitting 70 by driving screws through holes 37 provided in strap and threaded shafts 74 provided in fitting 70. Similarly to the screws used to connect together the front and rear casings, it is preferred that uniquely socketed security screws are used. The screw holes and shafts are also aligned in a horizontally and vertically symmetrical pattern, which affords the connection in the separate alignment.

Fitting 70 is attached to panel 20 by passing a rod 17 through channel 73. Fitting 70 is free to slide along rod 17 in the direction of the arrow shown in FIG. 2 to a convenient location. It is then secured in place through the use of a grub screw. Rod 17 is attached to panel by insertion into the rod holders 60 provided in rear casing 50. The rotational position of panel 20 can be adjusted by rotating rod holders 60 about an axis defined by rod 17. Once in a suitable rotational position, the panel 20 is secured to rod 17, again by the use of grub screws that are driven through threaded holes 66 and 67 that are respectively provided in rod holders 60 and 62.

As illustrated in FIGS. 1 and 2, more than one fastener can be attached to a single panel 20. The number of fasteners used is a function of variables including the size of the panel and the orientation of connection to the beverage font (i.e. whether it is connected vertically, horizontally, or in some other direction). The display apparatus 10 can also be installed so that it spans across multiple fonts by attaching a separate fastener to a pipe of each font.

Figure 17:
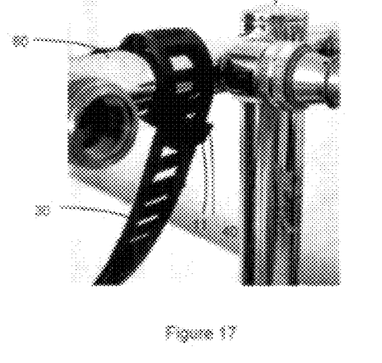
FIGS. 17 to 19 illustrate the strap and fitting of the display apparatus attached to a beverage font.
Figure 19:
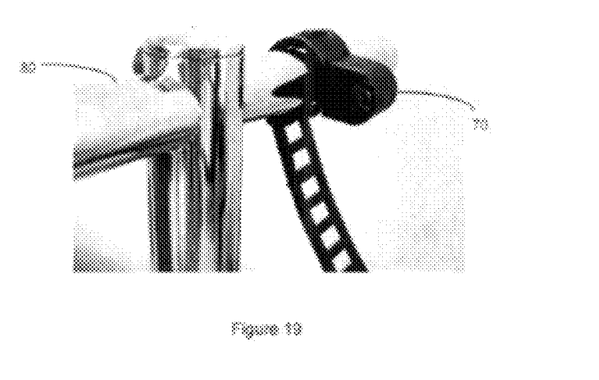
Figure 20:
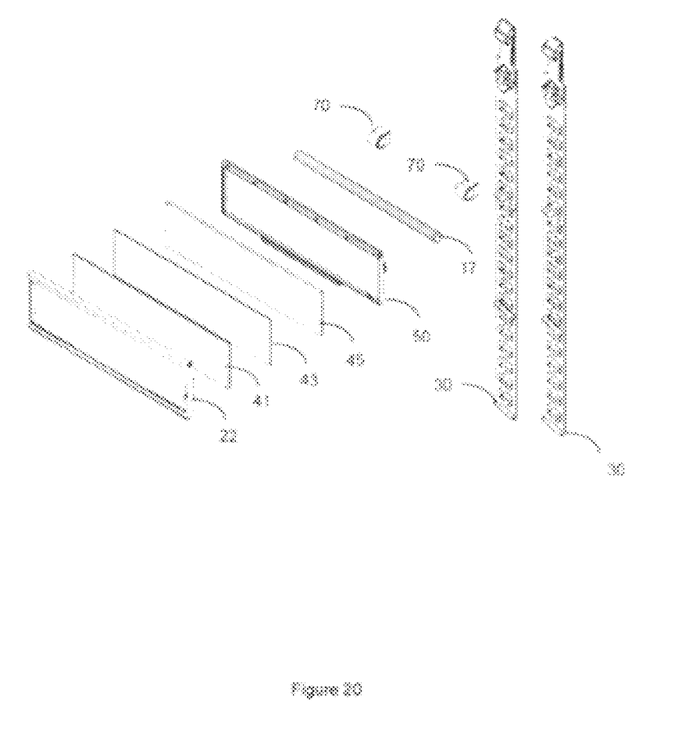

As shown in FIGS. 17 to 19, connecting the display apparatus 10 to the piping 80 of a beverage font 85 is a simple process of locating strap 30 on the upwards-facing surface of piping 80 so that the hook 40 extends around the piping's lower-facing surface and out beyond the piping 80. The free end of strap 30 is then stretched tightly around the piping 80 and a suitable one of the rectangular holes 11 is passed over the hook 40. This connecting operation can be easily performed by any venue operator or salesperson (that is to say that specialised technical expertise is not required).

Removing the display apparatus 10 is also easily achieved by simply unhooking the strap 30 from the hook 40.

Any tail of the strap can be conveniently detached (such as by cutting the silicone material) if required.

Figure 21:
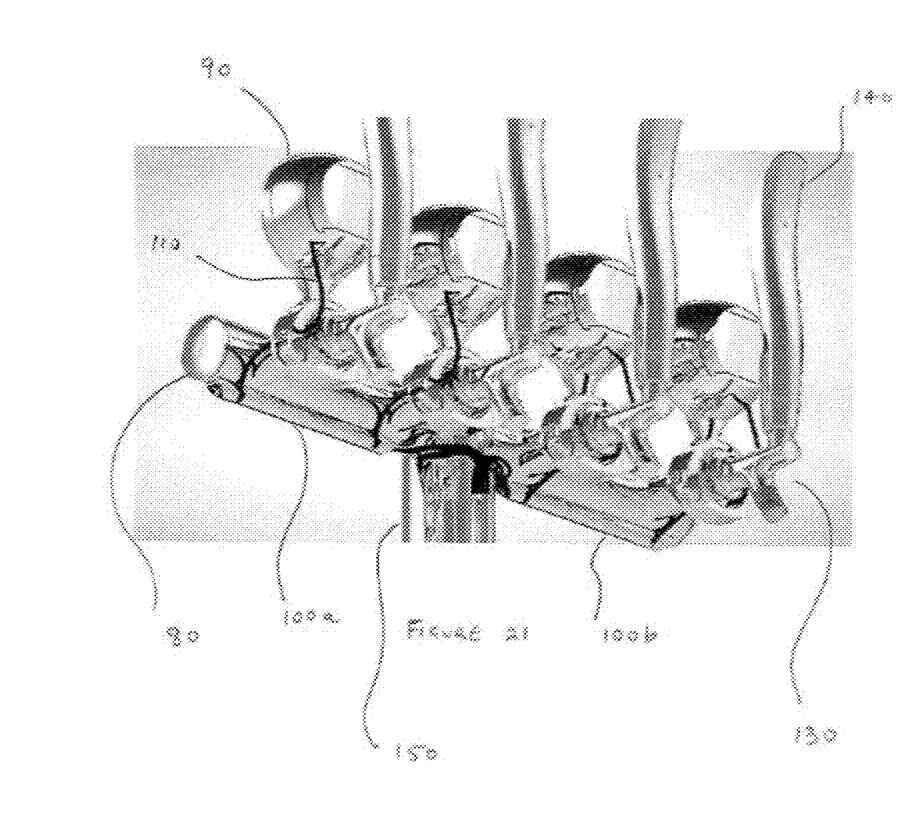

FIG. 21 shows a beverage font 130 having a bank of taps 90 and dispensing tap handles 140. Pipe 80 on which taps 90 are mounted extends in a substantially horizontal direction. Conduit 100 is in the embodiment shown composed of two parts 100a and 100b separated by font support 150. Conduit 100 is disposed on the underside of pipe 80 and is intended to act as a shroud for wires 110 which carry a source of power for illumination means (not shown) and lead to the display for taps 90 to enable illumination of the display.

Figure 22:
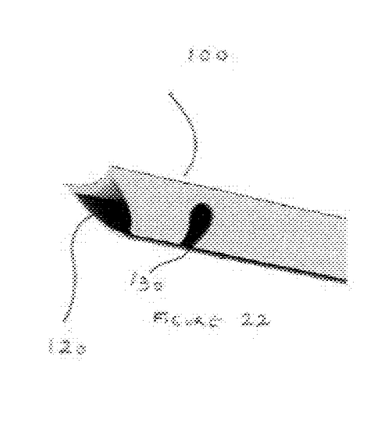

FIG. 22 illustrates conduit 100 in the form of an elongated hollow member 120 in which one or more wires (not shown) is receivable. Notch 130 is provided to permit one or more of the wires to be fed out of conduit 100 and then connected to the tap display. Conduit 100 can also act as a cold conductor, and will accordingly typically be made from a metallic or synthetic or metal-like material having thermal conductivity properties to facilitate that effect.

Different embodiments of the present invention have a number of advantages over the prior art devices discussed above, including:

allowing for the display of non-permanent advertising and branding material;
providing an effective integration of the apparatus with the font itself, in that the apparatus has the appearance of being an integral part of the font, rather than a separate piece of advertising or branding;
the flexibility of vertical and horizontal display;
the flexibility of an adjustable viewing angle—which allows the apparatus to be attached at any suitable location on the font;
the ability of the silicone fastener to protect the apparatus and advertising material against condensation from the font;
flexibility in the use of illuminated, non-illuminated, digital and non digital advertising material;
allowing the venue to include its own advertising rather than being limited to the brewer's beverage, as in the case of a tap-badge;
minimising clutter, in that the apparatus alleviates the need for other advertising or displays near the font;
featuring several security mechanisms protecting the advertising material; and
the use of ridges to assist the strip in gripping to the font.

The word 'comprising' and forms of the word 'comprising' as used in this description do not limit the invention claimed to exclude any variants or additions.

Modifications and improvements to the invention will be readily apparent to those skilled in the art. Such modifications and improvements are intended to be within the scope of this invention.

The invention claimed is:

1. A display apparatus, comprising:
an elongate panel configured to receive and display advertising material;
a connector attached to the panel; and
a first fastener configured to removably connect the panel to a first pipe of a beverage font, the first fastener being removably attachable to the connector in two or more orientations; and
a second fastener configured to removably connect the panel to the first pipe or to a second pipe of the beverage font.

2. The display apparatus according to claim 1, wherein said first fastener includes a plug and said connector includes a socket, the plug and socket having matching profiles such that the plug is receivable in the socket in said two or more orientations.

3. The display apparatus according to claim 2, wherein said plug and socket have a profile that is symmetrical about both horizontal and vertical axes, said profile allowing the plug to be received in the socket in four separate orientations.

4. The display apparatus according to claim 3, wherein said plug and socket have a cross-shaped profile.

5. The display apparatus according to claim 4, wherein said first fastener includes a flexible strip with securing means for securing said strip to itself so as to encircle the pipe of the beverage font and removably connect said panel to said pipe.

6. The display apparatus according to claim 5, wherein said securing means includes one or more apertures in said strip and a hook, in use said strip being securable to itself by passing said hook through one of said apertures.

7. The display apparatus according to claim 6, wherein said hook and strip are composed of different materials having different hardnesses.

8. The display apparatus according to claim 7, wherein said hook has a material hardness which is greater than the material hardness of said strip.

9. The display apparatus according to claim 8, wherein said connector is attachable to said panel such that its translational position is adjustable.

10. The display apparatus according to claim 9, wherein said connector is attachable to said panel in a manner that allows said panel's rotational orientation to be adjusted relative to said connector.

11. The display apparatus according to claim 10, further including access means for allowing the replacement or updating of said advertising material.

12. The display apparatus according to claim 11, wherein said access means comprises first and second pivotally connected casings.

13. The display apparatus according to claim 12, wherein said casings include a lock for securing said casings together so as to prevent unauthorized access to said advertising material.

14. The display apparatus according to claim 13, wherein said panel comprises an electronic display screen for displaying said advertising material.

15. A display apparatus comprising:
   an elongate panel configured to receive and display advertising material; and
   a first fastener configured to removably connect said panel to a pipe of a beverage font and for insulating said panel against condensation; and
   a second fastener configured to removably connect said panel to said pipe.

16. The display apparatus according to claim 15, further including illumination means to illuminate said advertising material.

17. A beverage font having a pipe to which a display apparatus according to claim 1 has been connected.

18. The display apparatus according to claim 1, wherein said first fastener includes a flexible strip with securing means for securing said strip to itself so as to encircle the first pipe of the beverage font and removably connect said panel to said first pipe.

19. The display apparatus according to claim 1, wherein said connector is attachable to said panel such that its translational position is adjustable.

20. The display apparatus according to claim 1, further including access means for allowing the replacement or updating of said advertising material.

* * * * *